United States Patent
Chan

(10) Patent No.: US 11,561,764 B2
(45) Date of Patent: Jan. 24, 2023

(54) OPERATING MODES THAT DESIGNATE AN INTERFACE MODALITY FOR INTERACTING WITH AN AUTOMATED ASSISTANT

(71) Applicant: Google LLC, Mountain View, CA (US)

(72) Inventor: Haywai Chan, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/473,049

(22) Filed: Sep. 13, 2021

(65) Prior Publication Data

US 2021/0405965 A1    Dec. 30, 2021

Related U.S. Application Data

(63) Continuation of application No. 16/331,401, filed as application No. PCT/US2018/054862 on Oct. 8, 2018, now Pat. No. 11,119,726.

(51) Int. Cl.
   *G06F 3/16*     (2006.01)
   *H04W 4/80*    (2018.01)
   (Continued)

(52) U.S. Cl.
   CPC ............ *G06F 3/167* (2013.01); *G06F 3/017* (2013.01); *G06F 3/04847* (2013.01);
   (Continued)

(58) Field of Classification Search
   None
   See application file for complete search history.

(56) References Cited

U.S. PATENT DOCUMENTS

2007/0123191 A1    5/2007  Simpson
2009/0077504 A1    3/2009  Bell et al.
(Continued)

FOREIGN PATENT DOCUMENTS

EP    2648077    10/2013
WO    2010054373    5/2010

OTHER PUBLICATIONS

European Patent Office; Written Opinion of the International Preliminary Examining Authority of PCT Ser. No. PCT/US2018/054862; 16 pages; dated Sep. 15, 2020.
(Continued)

*Primary Examiner* — Ryan Barrett
(74) *Attorney, Agent, or Firm* — Gray Ice Higdon

(57) ABSTRACT

Implementations described herein relate to transitioning a computing device between operating modes according to whether the computing device is suitably oriented for received non-audio related gestures. For instance, the user can attach a portable computing device to a docking station of a vehicle and, while in transit, wave their hand near the portable computing device in order to invoke the automated assistant. Such action by the user can be detected by a proximity sensor and/or any other device capable of determining a context of the portable computing device and/or an interest of the user in invoking the automated assistant. In some implementations location, orientation, and/or motion of the portable computing device can be detected and used in combination with an output of the proximity sensor to determine whether to invoke the automated assistant in response to an input gesture from the user.

20 Claims, 7 Drawing Sheets

(51) Int. Cl.

| | | |
|---|---|---|
| *G06F 40/56* | (2020.01) | |
| *G06F 3/01* | (2006.01) | |
| *G10L 13/00* | (2006.01) | |
| *G10L 15/18* | (2013.01) | |
| *G10L 15/22* | (2006.01) | |
| *H04B 1/3827* | (2015.01) | |
| *H04W 48/02* | (2009.01) | |
| *G10L 15/08* | (2006.01) | |
| *G06F 3/04847* | (2022.01) | |
| *G06F 3/04883* | (2022.01) | |
| *G06F 3/04886* | (2022.01) | |
| *G10L 15/00* | (2013.01) | |

(52) U.S. Cl.
CPC ...... *G06F 3/04883* (2013.01); *G06F 3/04886* (2013.01); *G06F 40/56* (2020.01); *G10L 13/00* (2013.01); *G10L 15/00* (2013.01); *G10L 15/1815* (2013.01); *G10L 15/22* (2013.01); *H04B 1/3827* (2013.01); *H04W 4/80* (2018.02); *H04W 48/02* (2013.01); *G10L 2015/088* (2013.01); *G10L 2015/223* (2013.01); *G10L 2015/228* (2013.01)

(56) References Cited

U.S. PATENT DOCUMENTS

| | | |
|---|---|---|
| 2013/0222329 A1 | 8/2013 | Larsby et al. |
| 2013/0275899 A1 | 10/2013 | Schubert et al. |
| 2014/0222436 A1 | 8/2014 | Binder et al. |
| 2014/0241540 A1 | 8/2014 | Hodges et al. |
| 2015/0014380 A1 | 1/2015 | Oyama et al. |
| 2015/0162000 A1 | 6/2015 | Di Censo et al. |
| 2015/0205359 A1 | 7/2015 | Feng et al. |
| 2015/0220149 A1 | 8/2015 | Plagemann et al. |
| 2016/0171980 A1 | 6/2016 | Liddell et al. |
| 2017/0010770 A1 | 1/2017 | Mianji |
| 2018/0018965 A1 | 1/2018 | Daley |
| 2018/0136824 A1 | 5/2018 | Knoppert et al. |
| 2018/0373487 A1 | 12/2018 | Gruber et al. |
| 2019/0295551 A1 | 9/2019 | White et al. |
| 2021/0048944 A1 | 2/2021 | Chandrababu et al. |
| 2021/0056964 A1 | 2/2021 | Nesiba et al. |

OTHER PUBLICATIONS

European Patent Office; International Search Report and Written Opinion of Ser. No. PCT/US2018/054862; 15 pages; dated Jun. 17, 2019.

European Patent Office; Communication pursuant to Article 94(3) issued in Application No. 18796192.5, 17 pages, dated Jun. 2, 2022.

OPERATING MODES THAT DESIGNATE AN INTERFACE MODALITY FOR INTERACTING WITH AN AUTOMATED ASSISTANT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input. An automated assistant responds to a request by providing responsive user interface output, which can include audible and/or visual user interface output.

In many cases, before the automated assistant can interpret and respond to a user's request, it must first be "invoked," for example, using predefined oral invocation phrases that are often referred to as "hot words" or "trigger phrase." Thus, many automated assistants operate in what will be referred to herein as a "default listening state" in which they are always "listening" to audio data sampled by a microphone for a limited (or finite, or "default") set of hot words. Any utterances captured in the audio data other than the default set of hot words are ignored. Once the automated assistant is invoked with one or more of the default set of hot words, it may operate in what will be referred to herein as a "speech recognition state" wherein for at least some time interval after invocation, the automated assistant performs speech-to-text ("STT") processing of audio data sampled by a microphone to generate textual input, which in turn is semantically processed to determine a user's intent (and to fulfill that intent).

However, in some contexts, a user may not be able to provide a coherent "hot word," such as when the user is driving in a car where multiple people are chatting, or when the user is at home listening to music or watching a movie. Should the automated assistant attempt to process a "hot word" in such contexts, the automated assistant may inadvertently capture audio being concurrently provided from a variety of different sources. As a result, the automated assistant may fail and/or provide erroneous output when a "hot word" is not discernible from other sounds that have been captured by audio data received by the automated assistant. This can lead to excess usage of computational and/or network resources, for instance, as a result of a user needing to provide a supplemental invocation phrase, that is more discernible from other background noise. Such supplemental invocation phrases must additionally be processed by a corresponding client device and/or remote automated assistant component(s), thereby causing additional usage of various computational/network resources.

SUMMARY

Implementations set forth herein relate to invoking an automated assistant from a computing device using a speechless and/or inaudible physical gesture, depending upon whether the computing device is operating in a particular environment and/or under particular conditions. In certain conditions, a user may not be able to clearly provide a trigger phrase because of background noise created by other people that are talking around the user, other devices that are projecting audio toward the user, and/or any other audible sounds that can interrupt or interfere with speech from the user. As a result, the automated assistant may end up processing audio that was not intended for the automated assistant, causing the automated assistant to provide an inadequate response, thereby wasting computational and/or network resources. For example, computational and/or network resources can be wasted when audio that has been captured by an assistant device is transmitted to a remote server for processing, and the processing of the audio data does not result in any content that is discernible by the automated assistant. Furthermore, should the user have to repeat a trigger phrase, in furtherance of ensuring that the automated assistant receives some amount of discernible audio input, such repetition of the same input to the automated assistant can waste power and computational resources, as the device that is providing access to the automated assistant must continually monitor and process audible input from the user. In order to resolve such technical deficiencies, the implementations set forth herein allow a user to invoke the automated assistant in response to a device detecting a non-audible feature of a physical gesture performed by the user, at least when the device is operating under particular conditions. In this way, should the user be in an environment where providing a clear spoken utterance would be difficult, the user can simply perform a particular physical gesture in order to initially invoke the automated assistant, despite the noisy environment.

In some implementations, the automated assistant can be accessible to a portable computing device, such as a cellular phone, which can operate according to multiple different operating modes for invoking the automated assistant. For example, a first operating mode can allow the user to invoke the automated assistant by providing a spoken utterance to an automated assistant interface of the portable computing device. The portable computing device can transition into a second operating mode, in which the automated assistant can be invoked upon detection of a non-audio feature of a physical gesture performed by the user. The physical feature can be, for example, a hand wave over a portion of the portable computing device. The hand wave can be detected by a proximity sensor, which can be considered as a sensor of the one or more sensors that comprise the automated assistant interface.

The portable computing device can transition between the first operating mode and the second operating mode based on various data that is accessible to the portable computing device. In some implementations, the various data can include contextual data that characterizes a context in which the portable computing device is currently, or has previously been, operating. Alternatively, or additionally, the various data that is used to determine whether to transition the portable computing device from the first operating mode to the second operating mode can be provided by a device that is separate from the portable computing device. For example, a device that is separate from the portable computing device can be a docking apparatus, which can be configured to provide at least some amount of mechanical support to a portion of the portable computing device. Furthermore, in some implementations, the docking apparatus can include a transmitter, such as a near field communication (NFC) transmitter, which can transmit data to the portable computing device and/or receive data from the portable computing device. Such data received from the docking apparatus can indicate whether the portable computing device has been docked with the docking apparatus, as well as other data that can be associated with the docking of the portable computing device. In this way, data provided by the docking apparatus can be processed by the portable computing device, or a device that is in communication with the portable computing device, in order to determine whether to transition the portable computing device from the first operating mode to the second operating mode.

In some implementations, the docking apparatus can be connected to a vehicle associated with the user. The user can conveniently dock the portable computing device with the docking apparatus in order that the user can receive content from the portable computing device while directing more of their attention to driving their vehicle, or otherwise performing some activity while the vehicle drives itself. When the user is operating a vehicle in which multiple people are having a conversation, it may be difficult for the user to invoke the automated assistant using a spoken utterance, at least as a result of noise interfering with the spoken utterance. Therefore, according to implementations discussed herein, the portable computing device can be caused to transition from a first operating mode to a second operating mode at least based on the portable computing device determining that it has been docked with the docking apparatus. In some implementations, other information can be used in combination with data received from the docking apparatus in order to determine whether to transition the portable computing device from the first operating mode to the second operating mode. The other information can include location data and/or other sensor data, which can indicate a location of a portable computing device, whether the portable computing device is located near the user, whether the portable computing device has received any physical contact from the user within a threshold period of time, whether a particular application is active at the portable computing device or another device that is associated with the portable computing device, and/or any other relevant information suitable for determining whether to transition a portable computing device from the first operating mode to the second operating mode.

In some scenarios, it may be desirable for the user to stop the automated assistant from providing further audible output, such as when the automated assistant is projecting audio over a conversation or phone call. Therefore, despite having invoked the automated assistant through performance of an inaudible physical gesture, the user can stop the automated assistant from providing further audible output by performing another inaudible physical gesture. For instance, the user can be riding in a vehicle where the portable computing device is docked and therefore operating according to the second operating mode. If the automated assistant is providing audible output when another user in the car receives an incoming phone call, the user can pause or stop the automated assistant from providing further audible output by performing an inaudible physical gesture. In this way, not only is the user controlling the automated assistant to prevent it from interrupting the phone call, but the user is also avoiding individually interrupting the phone call with a spoken utterance. In other words, the user can simply perform an inaudible physical gesture, such as waving their hand in front of the portable computing device, in order that no additional audio is inserted into the environment where the other person is receiving or participating in a phone call.

The above description is provided as an overview of some implementations of the present disclosure. Further description of those implementations, and other implementations, are described in more detail below.

In some implementations, a method implemented by one or more processors is set forth as including operations such as causing a portable computing device to operate in a first operating mode, wherein, when the portable computing device is operating in the first operating mode, the portable computing device is configured to: invoke an automated assistant in response to detection of a spoken trigger phrase, and restrict usage of a proximity sensor, which is in communication with the portable computing device, for invoking the automated assistant. The method can further include can operation of processing contextual data that characterizes a current context of the portable computing device, wherein the contextual data is generated based on sensor output from one or more sensors of the portable computing device. The method can also include causing the portable computing device to operate in a second operating mode in response to the processing of the contextual data satisfying one or more criteria, wherein, when the portable computing device is operating in the second operating mode, the portable computing device is configured to invoke the automated assistant in response to the proximity sensor indicating that a physical gesture was performed by a user. The method can further include, when the portable computing device is operating in the second operating mode and the proximity sensor of the portable computing device indicates that the physical gesture was performed by the user: causing the automated assistant to be invoked in response to the proximity sensor indicating that the physical gesture was performed by the user.

In some implementations, the one or more sensors include a transmitter that is connected to docking apparatus and wherein processing the contextual data further includes: determining that the portable computing device is within a minimal distance for receiving broadcasted data from the transmitter. In some implementations, the portable computing device includes a touch sensor and wherein processing the contextual data includes: determining that the touch sensor has not received direct physical contact from the user for a threshold period of time. In some implementations, processing the contextual data includes determining, based on the sensor output, that the portable computing device has been stationary at a location that is physically separated from the user for a threshold period of time. In some implementations, processing the contextual data includes determining, based on processing the contextual data, that an environment of the portable computing device is receiving audio being projected by another person. In some implementations, causing the portable computing device to operate in the second operating mode is further in response to determining that the environment of the portable computing device is receiving audio that is being projected by the other person. In some implementations, processing the contextual data includes determining, based on processing the contextual data, that an environment of the portable computing device is receiving audio that is being projected by another computing device, wherein causing the portable computing device to operate in the second operating is further in response to determining that the environment of the portable computing device is receiving audio that is being projected by the other computing device, and wherein the automated assistant is accessible via the other computing device. In some implementations, the method can include causing, in response to the proximity sensor indicating that the physical gesture was performed by the user, a touch screen display of the portable computing device to provide an interactive graphical element that includes natural language text, wherein the interactive graphical element is configured to modify an operation of the other computing device in response to the user providing a different gesture for selecting the interactive graphical element. In some implementations, the other computing device is performing the operation when the portable computing device is operating in the second operating mode.

In other implementations, a method implemented by one or more processors is set forth as including operations such as receiving, by a portable computing device that is operating according to a first operating mode, a near-field communication (NFC) transmission from a docking apparatus, wherein the NFC transmission indicates a presence of the docking apparatus to the portable computing device when the portable computing device is within a minimal distance for detecting a broadcast from the docking apparatus, and wherein, when the portable computing device is operating in the first operating mode, the portable computing device is configured to invoke an automated assistant in response to a spoken utterance from a user. The method can further include operations such as determining, in response to receiving the NFC transmission, that the portable computing device is docked at the docking apparatus, which is configured to provide mechanical support to at least a portion of the portable computing device. The method can also include causing, in response to determining that the portable computing device is docked at the docking apparatus, the portable computing device to operate according to a second operating mode, wherein, when the portable computing device is operating according to the second operating mode, the portable computing device is configured to invoke the automated assistant in response to detecting a non-audio feature of a physical gesture performed by the user. The method can further include, when the portable computing device determines that the non-audio feature of the physical gesture was performed by the user: causing the automated assistant to perform certain processing of audio data, captured by a microphone of the portable computing device, wherein the certain processing is not performed when the automated assistant is not invoked.

In some implementations, the method can include, when the portable computing device determines that the non-audio feature of the physical gesture was performed by the user: determining that the user has provided a spoken natural language input to an automated assistant interface of the portable computing device subsequent to the user performing the physical gesture. In some implementations, the physical gesture is detected by a proximity sensor that is integral to the portable computing device and the spoken natural language input is detected by the microphone. In some implementations, the method can include determining that contextual data, which characterizes a context of the portable computing device, satisfies a criterion for transitioning the portable computing device from the first operating mode to the second operating mode, wherein causing the portable computing device to operate according to the second operating mode is further in response to determining that the contextual data satisfies the criterion. In some implementations, the context is a mode of transportation in which the docking apparatus is being carried, and the criterion identifies an automobile as at least one mode of transportation in which the portable computing device, when docked, can transition from the first operating mode to the second operating mode.

In some implementations, the method can include causing a portable computing device to operate according to a first operating mode in which the portable computing device is configured to invoke an automated assistant in response to a user providing a spoken utterance. The method can also include receiving, while the portable computing device is operating in the first operating mode, data indicating that the portable computing device is physically situated such that a proximity sensor, which is integral to the portable computing device, is capable of detecting a physical gesture performed by the user. The method can further include causing, in response to receiving the data, the portable computing device to operate according to a second operating mode in which the automated assistant is configured to be invoked in response to the proximity sensor detecting a non-audio feature of the physical gesture performed by the user. The method can also include, when the proximity sensor detects the non-audio feature of the physical gesture performed by the user: causing the automated assistant to provide a natural language output via an automated assistant interface of the portable computing device In some implementations, the method can include monitoring by the portable computing device a sensor output of the proximity sensor more frequently when operating in the second operating mode than the first operating mode. In some implementations, the natural language output is at least a portion of audible dialog and the automated assistant interface is a speaker that is connected to the portable computing device. In some implementations, the natural language output is text that is provided at a selectable element, which is displayed at a touch screen display panel of the portable computing device. In some implementations, the data indicating that the portable computing device is physically situated such that the proximity sensor is capable of detecting the physical gesture performed by the user includes location data that characterizes a location of the portable computing device relative to the user or idle time data that characterizes an amount of time that the user has ceased providing an input to the portable computing device. In some implementations, the data indicating that the portable computing device is physically situated such that the proximity sensor is capable of detecting the physical gesture performed by the user includes trajectory data that characterizes a velocity or a direction in which the portable computing device is moving. In some implementations, the method can include monitoring a sensor output of the proximity sensor to determine whether the non-audio feature of the physical gesture has been performed by the user, wherein the non-audio feature of the physical gesture includes positioning an appendage of the user proximate enough to the portable computing device to cause a change in the sensor output of the proximity sensor.

In some implementations, an automated assistant can be invoked in response to detecting a user gesture and a user-directed gaze, and/or detecting an occurrence of one or more other condition(s), when a corresponding computing device is operating in a particular operating mode. The occurrence of the one or more other conditions can include, for example: detecting, based on audio data, voice activity (e.g., any voice activity, voice activity of the user providing the gesture and directed gaze, voice activity of an authorized user, voice activity that includes a spoken invocation phrase) in temporal proximity to the detected gesture and directed gaze; detecting, based on vision data, mouth movement of the user that co-occurs with, or is in temporal proximity to, the detected gesture and directed gaze; detecting, based on audio data and/or vision data, that the user is an authorized user; and/or detecting other condition(s). For example, buffered audio data can be transmitted by the client device to one or more remote automated assistant components in response to detecting the gesture and the directed gaze, and in response to detecting voice activity in at least part of the buffered audio data (e.g., using a voice activity detector (VAD) module).

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s))) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
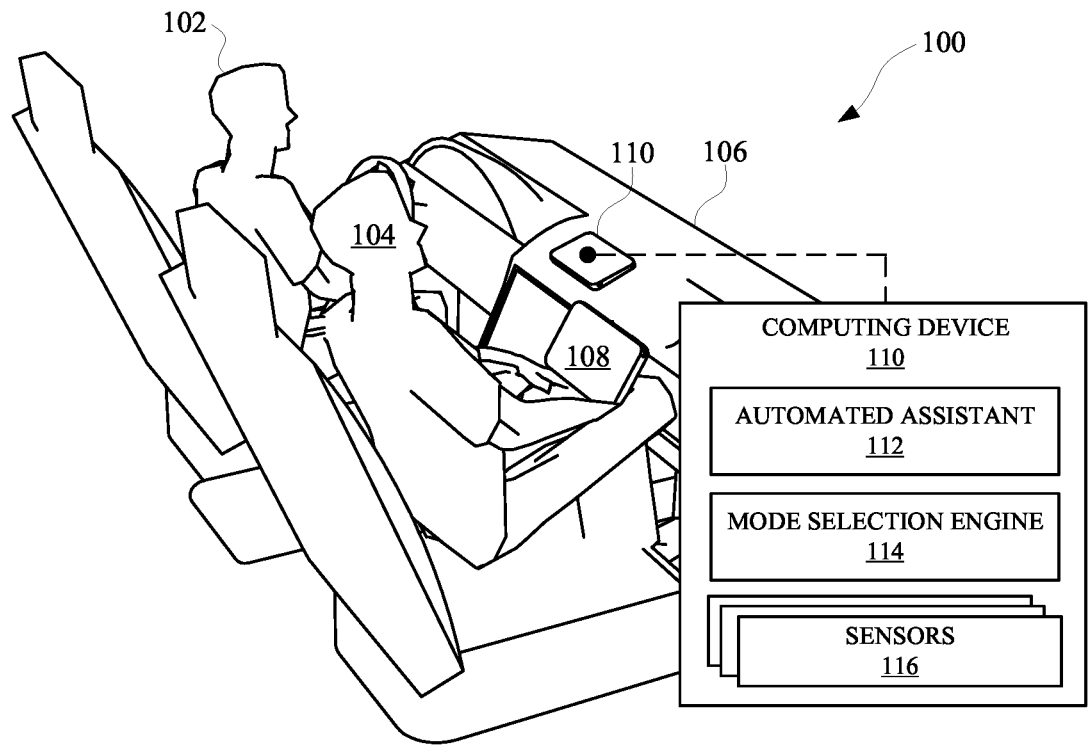
FIG. 1A and FIG. 1B illustrate a computing device being transitioned into an operating mode via which an automated assistant can be invoked using a physical gesture that has a non-audio feature.
Figure 1B:
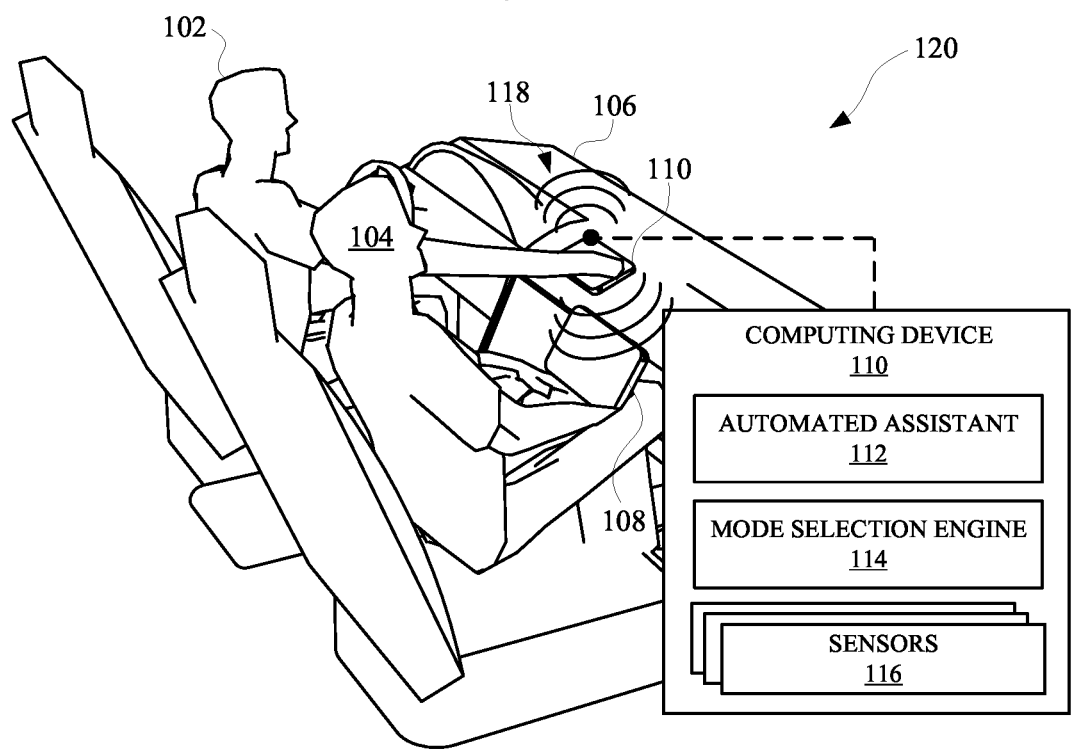

FIG. 1A and FIG. 1B illustrate a computing device 110 being transitioned into an operating mode via which an automated assistant can be invoked using a physical gesture that has a non-audio feature. Specifically, FIG. 1A illustrates a perspective view 100 of a first user 102 and a second user 104 sitting in a vehicle 106. The first user 102 can rest the computing device 110 at a location within the vehicle 106, for instance, on a surface of the vehicle 106, and/or secure the computing device 110 to a docking apparatus that is attached or otherwise located in the vehicle 106. The computing device 110 can include or access an automated assistant 112, which can be responsive to natural language inputs provided by the first user 102 and/or the second user 104. In some implementations, while the computing device 110 is located within the vehicle, the computing device 110 can transition into different operating modes, which can allow the automated assistant to be invoked in response to one or more particular gestures performed by the user 102.

The computing device 110 can operate according to multiple different operating modes, and each operating mode can provide at least one different way to invoke the automated assistant. In some implementation, an operating mode of the computing device 110 can be selected by a mode selection engine 114, which can process sensor output from one or more sensors 116 that are integral to the computing device 110. Alternatively, or additionally, the mode selection engine 114 can cause the computing device 110 to transition into a particular operating mode based on data received from one or more devices than are external to the computing device 110. For example, the vehicle 106 can include a computing device and/or one or more sensors, which can provide data to the computing device 110. Alternatively, or additionally, the user 102 can have one or more wearable devices that can provide data to the computing device 110 for use by the mode selection engine 114 when determining a particular mode to transition the computing device 110.

When the user 102 is traveling in the vehicle 106 and has placed the computing device 110 away from their body, the user 102 may wish to invoke the automated assistant 112 for performing a particular action, such as reading a schedule, sending a message, placing a phone call, searching the internet, and/or any other action that can be performed directly or indirectly by an automated assistant. However, because the first user 102 is riding in the vehicle 106 with the second user 104, the user 102 may not want to disturb the second user 104, who may be using another computing device 108 to perform a particular action such as placing a phone call or watching a movie. Furthermore, if the first user 102 was to provide a spoken utterance to invoke the automated assistant 112, audio data, generated in response to the computing device 110 receiving the spoken utterance, can exhibit interference caused by other sounds within or outside the vehicle 106. As a result, computational resources and/or network resources can be wasted on processing audio that may not be discernible by a device that is processing the audio. In order to eliminate the waste of such computational resources and network resources, the mode selection engine 114 can cause the computing device 110 to operate according to a particular operating mode when one or more sensors 116 indicate that the computing device 110 is physically separated from the user 102, located remotely from the user 102, has not received physical contact from the user 102 with a threshold period of time, and/or is otherwise operating within a context in which a user may not be able to adequately provide the spoken utterance.

In some implementations, a docking apparatus that is included in the vehicle 106 can provide an NFC signal to the computing device 110 in order to indicate that the computing device 110 has been docked to the docking apparatus. In response to the computing device 110 receiving the NFC signal from the docking apparatus, the mode selection engine 114 can transition the computing device 110 from a first operating mode to a second operating mode. When operating the first operating mode, the computing device 110 can cause the automated assistant 112 to be invoked in response to a spoken utterance from the user 102. When operating in the second operating mode, the computing device 110 can cause the automated assistant 112 to be invoked in response to the user 102 providing a physical gesture, such as a hand wave 118 over a portion of the computing device 110.

In some implementations, the mode selection engine 114 can transition the computing device 110 from the first operating mode to a second operating mode according to other data that is accessible to the computing device 110. For example, the mode selection engine 114 can cause the computing device 110 to transition into from the first operating mode to the second operating mode when the computing device 110 connects to a local network connection that is provided by a device that is connected to, or integral to, the vehicle 106. Additionally, or alternatively, the mode selection engine 114 can cause the computer 110 to transition from the first operating mode the second operating mode when one or more sensors 116 indicate or provide a sensor output that indicates the computing device 110 is traveling in a vehicle 106, is within an environment that includes multiple people, is within an environment where audio from multiple different audio sources is being projected, and/or is otherwise located away from the user 102 at a distance at which the user may not be able to adequately provide a spoken utterance for invoking the automated assistant 112. For example, the mode selection engine 114 can cause the computing device 110 to transition from a first operating mode to a second operating mode in response to determining that at least one other person besides the user 102 is causing audio to be projected at a loudness level that satisfies a criterion for transitioning to the second operating mode. Alternatively, or additionally, the mode selection engine 114 can cause the computing device 110 to transition from the first operating mode to the second operating mode in response to determining that a touch sensor, which is integral to the computing device 110, has not received physical contact from the user 102 for at least a threshold period of time, thereby satisfying a criterion for transitioning to the second operating mode.

Figure 2A:
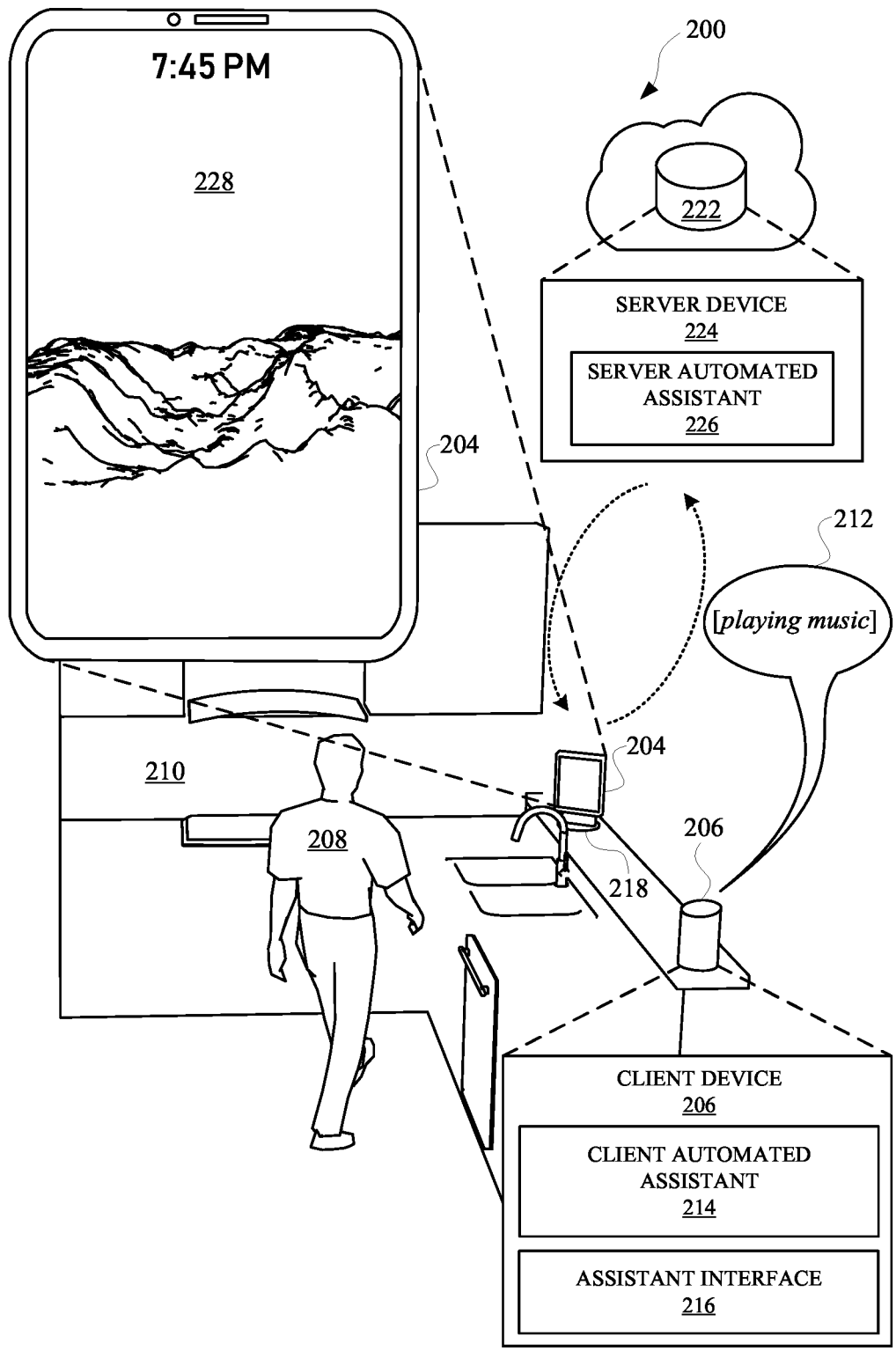
FIG. 2A and FIG. 2B illustrate perspective views of a user invoking an automated assistant using a physical gesture that includes an inaudible feature and/or characteristic.
Figure 2B:
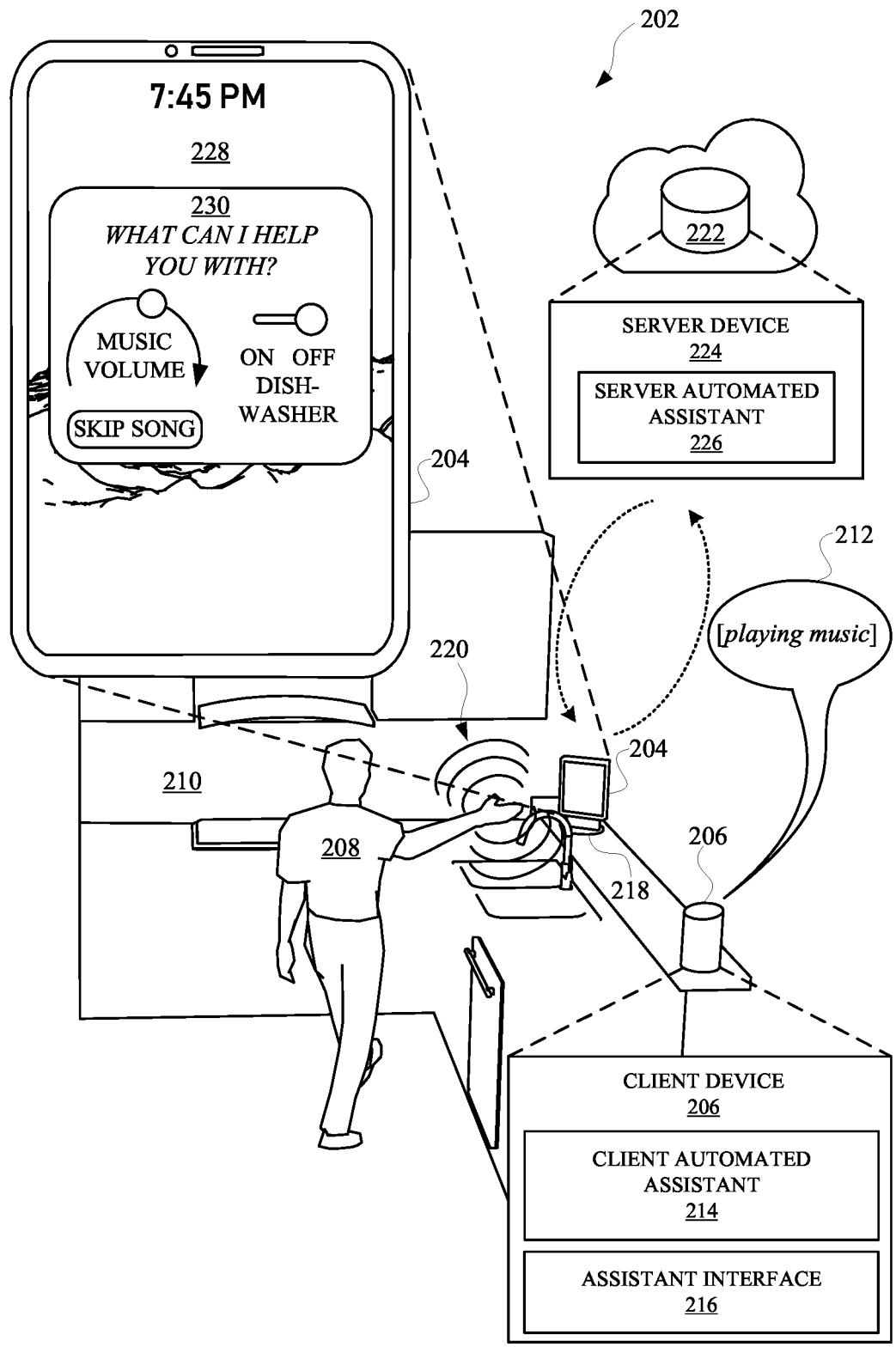

FIG. 2A and FIG. 2B illustrate a perspective view 200 and a perspective view 202, respectively, of a user 208 invoking an automated assistant using a physical gesture 220. Specifically, FIG. 1A illustrates a perspective view 200 of a user 208 who has positioned a portable computing device 204 at a docking apparatus 218 that is located within an environment 210, such as a kitchen. The portable computing device 204 can be, for example, a tablet computing device, a cellular phone, a laptop computing device, and/or any other device that can be connected to a docking apparatus. The portable computing device 204 can include a local automated assistant application and/or access a server automated assistant 226 via a network connection, such as the internet. The server automated assistant 226 can be provided at a server device 224 and/or any other remote computing device 222. When the user 208 provides a spoken utterance or other natural language input to the automated assistant via the portable computing device 204, data that characterizes the natural language input can be transmitted to the server device 224 for processing, and any resulting data can be transmitted back to the portable computing device 204.

In response to the portable computing device 204 connecting to the docking apparatus 218, the portable computing device 204 can transition from a first operating mode to a second operating mode, as discussed herein. In this way, the portable computing device 204 can receive additional gestures 220 for invoking or otherwise controlling the automated assistant. In some implementations, the docking apparatus 218 can communicate with the portable computing device 204 to indicate to the portable computing device 204 that the user has docked the portable computing device 204 at the docking apparatus 218. In some implementations, data transmitted by the docking apparatus 218 can be used in combination with data, which characterizes a context in which the portable computing device 204 is docked, to determine whether to transition a portable computing device 204 from the first operating mode to the second operating mode. For example, contextual data can characterize an amount of audio being projected from one or more other devices that are different from the portable computing device 204. Specifically, if a client device 206, such as a standalone speaker device, is playing music 212, the additional contextual data can characterize a level at which the client device 206 is playing music. If a loudness (e.g., measured or proportional to Decibels) or an amount of noise projected by the client device 206 reaches or exceeds a threshold level, or otherwise satisfies a criterion, the portable computing device 204 can transition from a first operating mode to a second operating mode.

In some implementations, a physical gesture 220 being performed by the user 208 can detected by the portable computing device 204, when the portable computing device 204 is docked at the docking apparatus 218. For instance, the user 208 may not be able to adequately provide a spoken utterance for invoking the automated assistant via an automated assistant interface of the portable computing device 204. Therefore, because the user 208 may have multiple devices through which to access the automated assistant, the user 208 can provide a physical gesture that includes a non-audio feature for invoking an automated assistant 214 at the client device 206. Specifically, when the portable computing device 204 is docked at the docking apparatus 218, or otherwise operating in the second operating mode, the user 208 can provide a physical gesture 220, such as a hand wave, in front of a camera or over a proximity sensor of the portable computing device 204, in order to indicate to the portable computing device 204 that the user 208 would like to invoke an automated assistant. In response to the portable computing device 204 acknowledging or detecting the physical gesture 220, the portable computing device 204 can communicate with the server device 224 or the client device 206 to indicate that the user 208 is attempting to invoke the automated assistant. In response, the server device 224 can communicate with the client device 206 in order to invoke the client automated assistant 214. Alternatively, or additionally, in response to the portable computing device 204 communicating with the client device 206, the client device 206 can invoke the client automated assistant 214. In this way, although the client device 206 includes an assistant interface 216 with which the user 208 can provide a spoken utterance to invoke the client automated assistant 214, the user 208 can also rely on a non-audio feature of a physical gesture 220 in order to invoke the client automated assistant 214 via the portable computing device 204.

In some implementations, the portable computing device 204 can transition from a first operating mode to a second operating mode based on an operating status of the client device 206. For example, when the client device 206 begins playing music 212, data that characterizes an operation of the client device 206 can be transmitted to the server device 224 and/or portable computing device 204. In response to the server device 224 and/or the portable computing device 204 receiving the data, the portable computing device 204 can transition from the first operating mode to the second operating mode. In some implementations, a detected operating status of the client device 206 can cause the portable computing device 204 to transition from the first operating mode to the second operating mode. An operating status can include a status indicating that the client device 206 is participating in a phone call, playing music or other audio, conducting a query at the request of the user 208, receiving a natural language input from the user 208, providing a natural language output for the user 208, and/or otherwise performing an action that may interfere with an ability of the portable computing device 204 to acknowledge a spoken utterance from the user 208.

In some implementations, when the portable computing device 204 is operating in the second operating mode, the user 208 can cause an automated assistant to modify a graphical user interface 228 of the portable computing device 204 to include an interactive graphical element 230. Specifically, the user 208 can provide a physical gesture 220, which can be detected by the portable computing device 204, and invoke the automated assistant. The interactive graphical element 230 that is provided at the graphical user interface 228 can include one or more selectable elements and/or a natural language output, such as text, pictures, and/or any other graphical output that can be presented at a display panel. For instance, in response to detecting the physical gesture 220, the portable computing device 204 can communicate with the server device 224 to determine an operating status of one or more devices that are associated with the user 208. Such operating statuses can include an operating state of a device that is connected to a network to which the portable computing device 204 is also connected. For example, the server device 224 can provide contextual data that indicates a dishwasher is off, and that the client device 206 is playing music 212. Based on the contextual data received from the server device 224, and/or any other suitable source, the portable computing device 204 can generate the interactive graphical element 230. For instance, because the contextual data indicates that the dishwasher is off, the interactive graphical element 230 can provide a selectable switch with which to activate the dishwasher. Additionally, or alternatively, because the contextual data has identified the client device 206 as playing music, the portable computing device 204 can provide an interactive graphical element 230 that includes a volume control element and/or a song selection element, as illustrated in FIG. 2B. In this way, the user 208 does not necessarily need to provide a spoken utterance in order to adjust the music being played at the client device 206. This can allow the client device 206 to continue streaming music uninterrupted while simultaneously being controlled by a physical gesture in which the user 208 does not directly contact and/or directly speak to the client device 206.

In some implementations, when the portable computing device 204 is operating in the second operating mode, the user 208 can use a non-audio feature(s) of one or more different physical gestures in order to control particular selectable elements displayed at the graphical user interface 228. For instance, the user can waive their hand to invoke or dismiss the automated assistant. Additionally, or alternatively, the user 208 can direct their hand or other appendage (e.g. elbow) in a circular motion in order to adjust a position of a portion of a selectable element that has a circular feature, such as the music volume control provided at the interactive graphical element 230. Additionally, or alternatively, the user 208 can perform a lateral motion, or motion that is parallel to the ground, with an appendage in order to adjust a selectable element that appears to be a switch, such as the on-and-off dishwasher switch provided at the interactive graphical element 230. Additionally, or alternatively, the user can perform a stamping motion, or motion that is perpendicular to the ground, with an appendage in order to indicate that the user 208 would like to depress a button that is provided at the interactive graphical element 230, such as the "SKIP SONG" selectable element provided in FIG. 2B.

Figure 3:
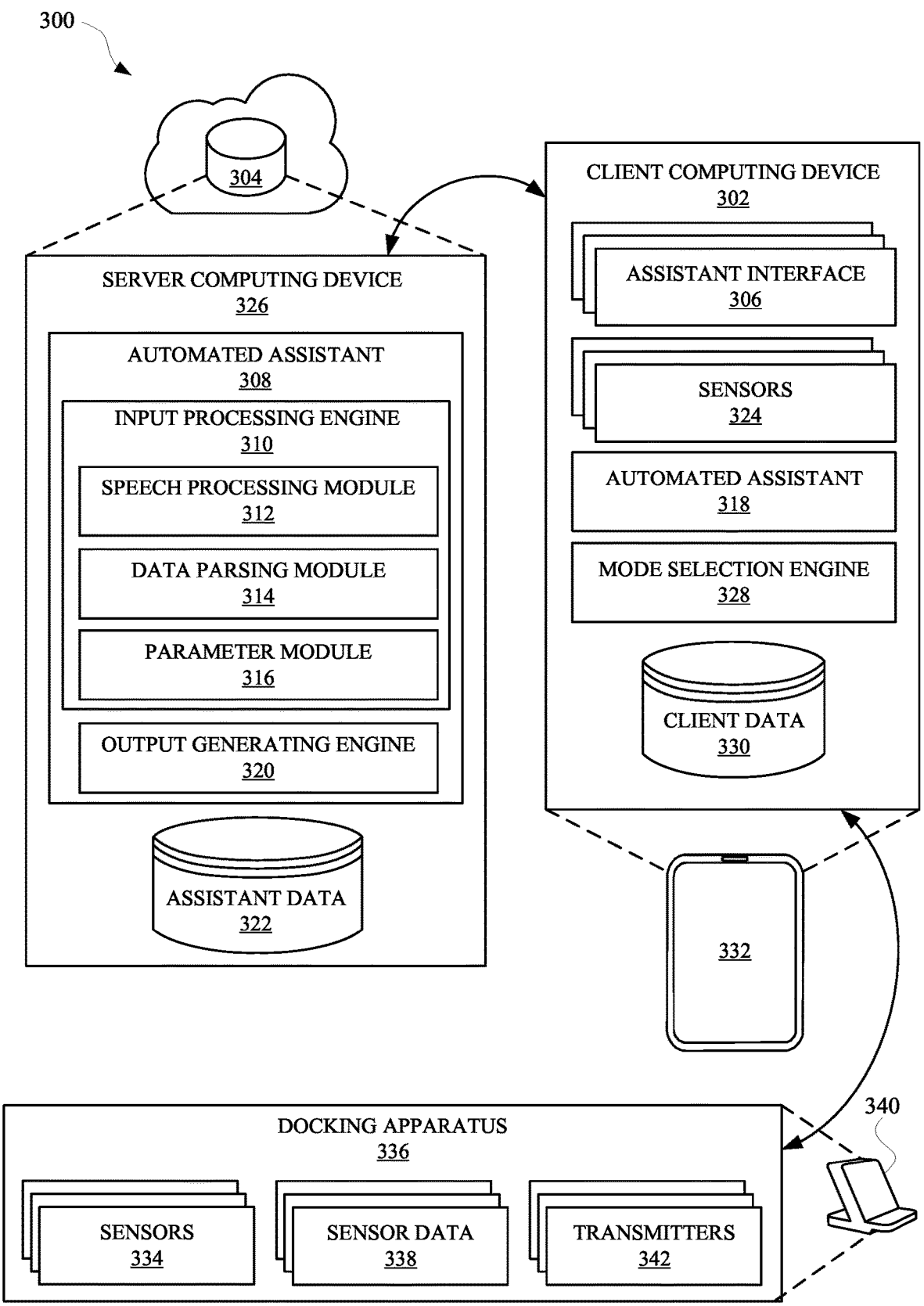
FIG. 3 illustrates a system for providing a client device with an ability to receive non-audio related gestures from a user for controlling certain aspects of the client device and/or any other device that can be associated with the user.

FIG. 3 illustrates a system 300 for providing a client device with an ability to receive non-audio related gestures from a user for controlling certain aspects of the client device and/or any other device that can be associated with the user. The system 300 can include a client computing device 302 that is in communication with a server computing device 326 and/or a docking apparatus 336. The client computing device 302 can include an automated assistant 318, which can operate as part of an automated assistant that is provided at one or more computing devices, such as a first client device (e.g., a cellular phone), a second client device (e.g., a standalone speaker device), and/or a remote computing device 304, such as a server computing device 326. A user can interact with the automated assistant 318 via one or more an assistant interfaces 306, which can include a microphone, a camera, a touch screen display panel, a user interface, a proximity sensor, a touch sensor, a temperature sensor, and/or any other apparatus capable of being responsive to a user of a computing device. For instance, a user can initialize the automated assistant 318 by providing a verbal, textual, and/or a graphical input to the assistant interface 306 to cause the automated assistant 318 to perform a function (e.g., provide data, control a peripheral device, access an agent, submit a query of a network, etc.). A client computing device 302 that provides at least a portion of the automated assistant 318 can include a display device, which can be a display panel that includes a touch interface for receiving touch inputs and/or gestures for allowing a user to control applications of the client computing device 302 via the touch interface. In some implementations, the client computing device 302 can lack a display device, thereby providing an audible user interface output, without providing a graphical user interface output. Furthermore, the client computing device 302 can provide a user interface, such as a microphone and/or one or more other sensors, for receiving spoken natural language inputs and/or any other inputs from the user.

The client computing device 302 can be in communication with the server computing device 326 over a network, such as the internet. The client computing device 302 can offload computational tasks to the server computing device 326, such as speech processing tasks, in order to conserve computational resources at the client computing device 302. For instance, in some implementations, the server computing device 326 can host the automated assistant 318, and the client computing device 302 can transmit inputs received at one or more assistant interfaces 306 to the server computing device 326. However, in some implementations, the automated assistant 318 can be hosted at the client computing device 302. In various implementations, all or less than all aspects of the automated assistant 318 can be implemented on the client computing device 302, and/or at an automated assistant 308 provided at the server computing device 326. In some of those implementations, aspects of the automated assistant 318 are implemented via a local automated assistant of the client computing device 302 and interface with the server computing device 326 that implements other aspects of the automated assistant 318. The server computing device 326 can optionally serve a plurality of users and their associated automated assistants via multiple threads. In implementations where all or less than all aspects of the automated assistant 318 are implemented via a local automated assistant of the client computing device 302, the local automated assistant can be an application that is separate from an operating system of the client computing device 302 (e.g., installed "on top" of the operating system)—or can alternatively be implemented directly by the operating system of the client computing device 302 (e.g., considered an application of, but integral with, the operating system).

In some implementations, the automated assistant 308 and/or automated assistant 318 can include an input processing engine 310, which can employ multiple different modules for processing inputs and/or outputs for the client computing device 302. For instance, the input processing engine 310 can include a speech processing module 312 that can process audio data received at an assistant interface 306 to identify the text embodied in the audio data. The audio data can be transmitted from the client computing device 302 to the server computing device 326 in order to preserve computational resources at the client computing device 302. The process for converting the audio data to text can include a speech recognition algorithm, which can employ neural networks, word2vec algorithms, and/or statistical models for identifying groups of audio data corresponding to words or phrases. The text converted from the audio data can parsed by a data parsing module 314 and made available to the automated assistant as textual data that can be used to generate and/or identify command phrases from the user. In some implementations, output data provided by the data parsing module 314 can be provided to a parameter module 316 to determine whether the user has provided an input that corresponds to a particular action capable of being performed by the automated assistant and/or an application or agent that is capable of being accessed by the automated assistant. For example, assistant data 322 can be stored at the server computing device 326 and/or the client computing device 302 and can include data that defines one or more actions capable of being performed by the automated assistant 318, as well as parameters necessary to perform the actions. The input processing engine 310 can determine that a user has requested a particular action be performed, the parameter module 316 can then determine one or more parameters for the particular action, and an output generating engine 320 can then provide an output to the user based on the particular action and/or the one or more parameters. For instance, in some implementations, in response to a user input, such as a gesture directed at the client computing device 302, the automated assistant 318 can cause data, which characterizes the gesture, to be transmitted to the server computing device 326 for determining the action that the user is intending the automated assistant 318 to perform.

In some implementations, the automated assistant 318, the client computing device 302, and/or the server computing device 326 can be responsive to one or more different types of gestures directed at the client computing device 302. For instance, when the client computing device 302 includes a speaker, a type of gesture that can be used to control the volume can be a two-dimensional gesture (e.g., swiping a touch screen display or otherwise moving an appendage of the user in at least two-dimensions with or without directly contacting the client computing device 302) or a three-dimensional gesture (e.g., rotating two fingers on the touch screen display or otherwise moving an appendage of the user in at least three-dimensions with or without directly contacting the client computing device 302).

In some implementations, the client computing device 302 can operate according to multiple different operating modes as selected by a mode selection engine 328. For instance, when operating in a first operating mode, the client computing device 302 can invoke an automated assistant 318 in response to a spoken trigger phrase or spoken utterance provided by a user. Furthermore, when operating in the first operating mode, the client computing device 302 can restrict or otherwise limit usage of a proximity sensor of the sensors 324 for invoking the automated assistant 318. In other words, despite a user being close enough to the client computing device 302 to cause an output of a proximity sensor to change or otherwise indicate a presence of the user, the client computing device 302 will not invoke the automated assistant 318 despite the output of the proximity sensor—at least when the client computing device 302 is operating in the first operating mode.

In some implementations, the client computing device 302 can transition into the second operating mode, from the first operating mode, based on contextual data. Contextual data can be client data 330 that is available at the client computing device 302, assistant data 322 that is generated based on operations of the automated assistant 308 and/or automated assistant 318, or sensor data 338 that is generated based on operations of the sensors 334, and/or any combination of the aforementioned data. Client data 330 can include data that characterizes operations performed by sensors 324, the automated assistant 318, and/or any input or output received or provided at one or more assistant interfaces 306. For instance, one or more sensors 324 of the client computing device 302 can provide a sensor output that indicates the client computing device 302 is located a distance away from the user, and/or is located outside of a vicinity of the user that is suitable for the client computing device 302 to acknowledge a spoken utterance provided by the user.

The assistant data 322 can be generated based on one or more interactions between the automated assistant 308 and one or more users. For example, the assistant data 322 can characterize an interaction between the user and the automated assistant 308, in which the user is requesting directions while driving. Therefore, the mode selection engine 428 can use such data to determine that the client computing device 302 is currently being, or about to be, transported in a vehicle, and can therefore switch operating modes to a second operating mode so that the automated assistant 318 can be invoked via user interaction with a proximity sensor.

The sensor data 338 can be used by the mode selection engine 328 for determining whether the client computing device 302 is docked at the docking apparatus 336. For instance, one or more sensors 334 of the docking apparatus 336, such as the docking station 340, can detect a presence at the client computing device 302 and cause sensor data 338 to be generated and transmitted to the client computing device 302. In some implementations, the docking apparatus 336 can include one or more transmitters 342 capable of sending and/or receiving data, such as for communicating with the client computing device 302. For instance, the docking apparatus 336 can include a near field communications (NFC) transmitter for broadcasting data, which can be received by the client computing device 302. In response to receiving data from the docking apparatus 336, the mode selection engine 328 can confirm that the client computing device 302 is docked, and cause the client computing device 302 to transition to the second operating mode. As a result, the user will be able to invoke the automated assistant 318 by moving an appendage near the client computing device 302 simultaneous to the client computing device 302 being docked at the docking apparatus 336.

In some implementations, certain criteria must be satisfied by the contextual data in order for the mode selection engine 328 to transition the client computing device 302 between operating modes. For example, a client computing device 302 can include a touch sensor, and criteria for transitioning the client computing device 302 from the first operating mode to the second operating mode can be based on whether the user has interacted with the touch sensor within a threshold period of time. If the user has not interacted with the touch sensor within a threshold period of time, such as by touching a touch screen display of the client computing device 302, the client computing device 302 can transition into a second operating mode in which the automated assistant 318 can be invoked via interaction between the user and a proximity sensor that is in communication with the client computing device 302. Alternatively, or additionally, the sensors 334 and/or the sensors 324 can provide sensor output that indicates the client computing device 302 is physically separated from the user and/or has been physically separated from the user for a threshold period of time. In response to such sensor output, the mode selection engine 328 can cause the client computing device 302 to transition between operating modes.

In some implementations, a sensor 324 of the client computing device 302 can include one or more microphones, capable of being responsive to audio projected by one or more users when the one or more users are speaking. A microphone can provide a sensor output that characterizes the audio being projected by the user, and the mode selection engine 328 can cause the client computing device 302 to switch between operating modes based on the sensor output of a microphone. Audio data generated based on the output of the microphone can provide an indication of an environment in which the client computing device 302 is operating, a distance of the client computing device 302 from the user, and/or any other environmental conditions that may be affecting the client computing device 302.

For instance, based on ambient noise that is exhibited or audible within an environment of the client computing device 302, the client computing device 302 can determine that it is currently located in a vehicle that is currently driving. Therefore, in response to determining such environmental characteristics, the mode selection engine 328 can cause the client computing device 302 to transition from a first operating mode to a second operating mode. In this way, the client computing device 302 can more readily determine then it is in a vehicle, and therefore more quickly allow the user to invoke the automated assistant 318 by interacting with the proximity sensor of the client computing device 302. In some implementations, audio that causes the client computing device 302 to transition between operating modes can be provided by one or more users, one or more different computing devices, one or more different environmental features, and/or any other object that can create audible sound. In some implementations, audio that causes the client computing device 302 to transition between operating modes can be provided by another computing device that also has access to an automated assistant. In this way, the client computing device 302 is able to transition into a mode where the automated assistant 318 can be invoked without speaking, thereby eliminating any interruptions to operations being performed by an automated assistant at another computing device. In response to transitioning to the second operating mode, the client computing device 302 can provide a graphical user interface with one or more selectable elements for modifying an operation of the automated assistant 318 and/or an automated assistant that is accessible via another computing device. In this way, the user can perform gestures for interacting with a proximity sensor of the client computing device 302 in order to control particular operations of an automated assistant that is operating at a different computing device. It should be noted that any of the devices and/or apparatuses discussed herein can include one or more transmitters for communicating data via Bluetooth, Wi-Fi, LTE, wired, and/or any other protocol for communicating data.

Figure 4:
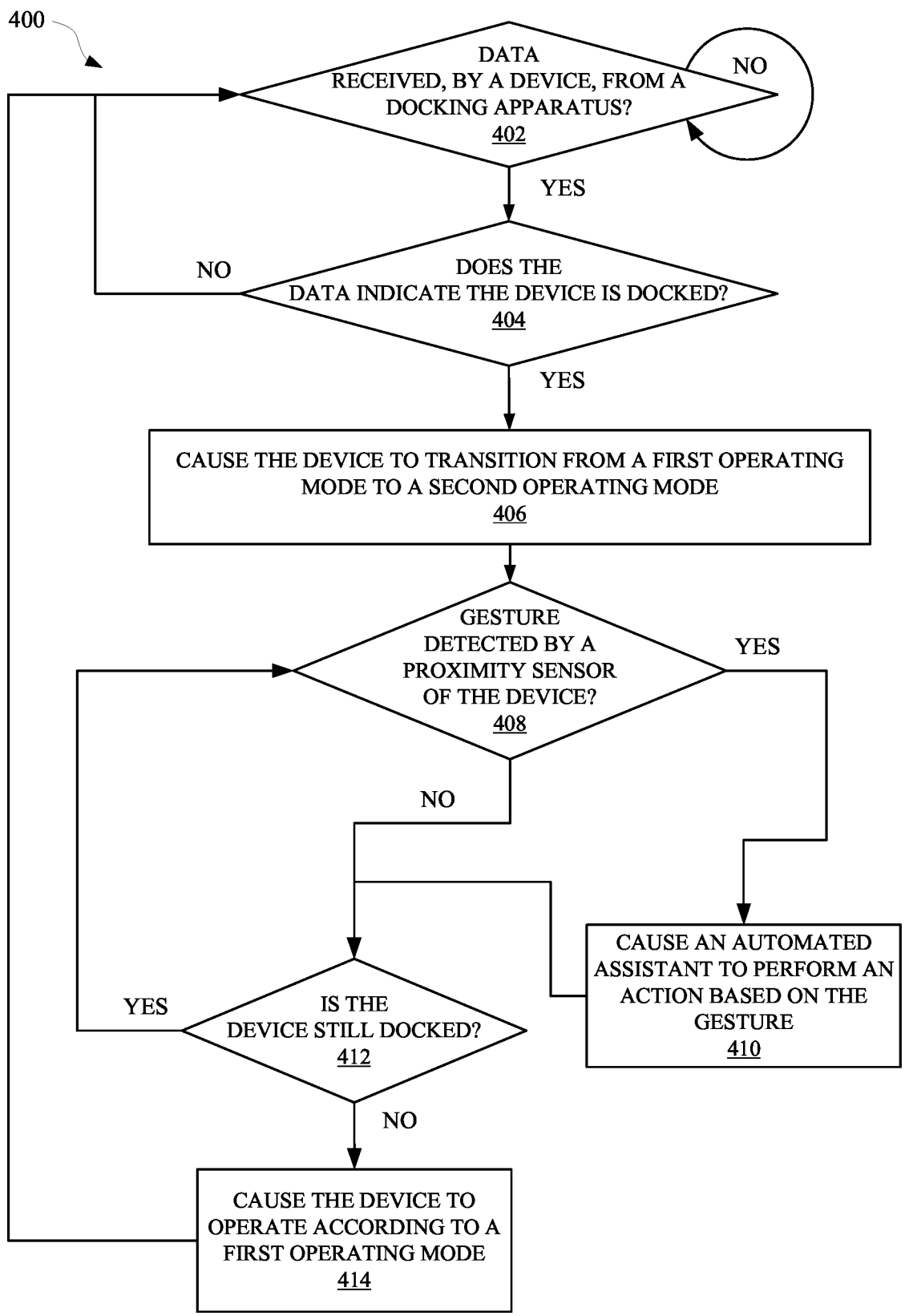
FIG. 4 illustrates a method for transitioning a computing device between operating modes based on whether the computing device is docked at a docking apparatus.

FIG. 4 illustrates a method 400 for transitioning a computing device between operating modes based on whether the computing device is docked at a docking apparatus. The method 400 can be performed by one or more devices, applications, and/or any other apparatus or module capable of controlling an operating mode of a device. The method 400 can include an operation 402 of determining whether a device received data from a docking apparatus. A docking apparatus can include an apparatus capable of mechanically supporting at least a portion other device. In some implementations, a docking apparatus can have additional capabilities of broadcasting data so that a device, which has received the broadcasted data, can determine whether it has been docked with the docking apparatus. A device, such as a portable computing device (e.g., a cell phone), can include a transmitter that periodically checks for broadcasted signals (e.g., NFC broadcasts). Therefore, the operation 402 can be performed periodically, as indicated by the circular arrow illustrated at FIG. 4.

When data is received by the device and from the docking apparatus, the method 400 can proceed to an operation 404. The operation 404 can include a determination of whether the received data indicates that their device is docked. If the data does not indicate that the device is docked, the method 400 can return to operation 402. If the data indicates that the device is docked, the method 400 can proceed to operation 406.

The operation 406 can include causing the device to transition from a first operating mode to a second operating mode. When operating in the first operating mode, the device can limit certain modalities through which an automated assistant can be invoked. When operating in the second operating mode, those modalities that were limited in the first operating mode can be less limited or otherwise available to the user for invoking the automated assistant. For example, when operating in the first operating mode, the device can restrict a sensor output of a proximity sensor from being used as a basis from which to invoke the automated assistant. Therefore, when operating in the first operating mode, the user would not be able to invoke the automated system by causing a non-audio feature of a physical gesture to be detected by the proximity sensor. However, when operating in the second operating mode, a non-audio feature of a physical gesture can be detected by a proximity sensor that is in communication with the device, and in response to detecting the non-audio feature of the physical gesture, the automated assistant can be invoked.

The method 400 can proceed to an operation 408 of determining whether a gesture was detected by a proximity sensor that is in communication with the device. A gesture can be one or more different physical actions performed by the user. For example, a gesture can be a physical motion of the user that may or may not be intended to create audio, but may otherwise be detectable by the proximity sensor. As a result of the gesture being performed by the user, the proximity sensor can provide a sensor output, which can characterize the performed gesture, and one or more processors of the device or a remote device can process the sensor output to determine whether the gesture corresponds to a request to perform a particular action that can be performed by an automated assistant.

When the gesture has not been detected by the proximity sensor, the method 400 can proceed to an operation 412 of determining whether the device is still docked at the docking apparatus. If the device is still docked, the method 400 can return to the operation 408. If the device is no longer docked, the method 400 can proceed to an operation 414. The operation 414 can include causing the device to operate according to the first operating mode. The device can be transitioned to the first operating mode when the device is no longer docked, in order that the proximity sensor can be employed for other functions of the device, rather than invoking the automated assistant. Adapting the usage of particular modalities through which the automated assistant can be invoked allows for a more effective and efficient usage of such modalities in particular environments. For instance, when the device is no longer docked, the proximity sensor can be employed to determine how proximate the device is to the user. For example, should the user place their device in their pocket, the device can operate in the first operating mode so that the proximity sensor does not trigger the automated assistant, but rather can trigger a vibration mode so that the user receives application notifications through vibration. Furthermore, limiting how the automated assistant is invoked can eliminate accidental triggering of the automated assistant, which can reduce unnecessary power consumption spikes and preserve network bandwidth.

When, at operation 408, a gesture is detected by the proximity sensor of the device, the method 400 can proceed to an operation 410. The operation 410 can include causing an automated assistant to perform an action based on the gesture. For example, a user can trigger the automated assistant when the device is docked within their vehicle by hovering their hand at, or within, a threshold distance from the device. In this way, should the vehicle have other occupants or other devices creating audio, the user would not necessarily have to rely on projecting a spoken utterance to invoke the automated assistant. Rather, the user can choose to invoke the automated assistant by performing a gesture that is detected by the proximity sensor or providing a spoken utterance that is detected by a microphone of the computing device, the docking apparatus, and/or a vehicle computing device that is integral to the vehicle. In some implementations, one or more different gestures can cause the automated assistant to perform one or more different actions when the device is operating in the second operating mode. Furthermore, when the device is operating in the first operating mode, the automated assistant can perform the one or more actions in response to the user performing one or more other gestures. In other words, the automated assistant can be responsive to a unique set of gestures for each operating mode. Additionally, or alternatively, one or more sensors can detect gestures for invoking or controlling the automated assistant when operating in the first operating mode, and one or more other sensors can be used to detect gestures for invoking or controlling the automated assistant when operating in the second operating mode.

Figure 5:
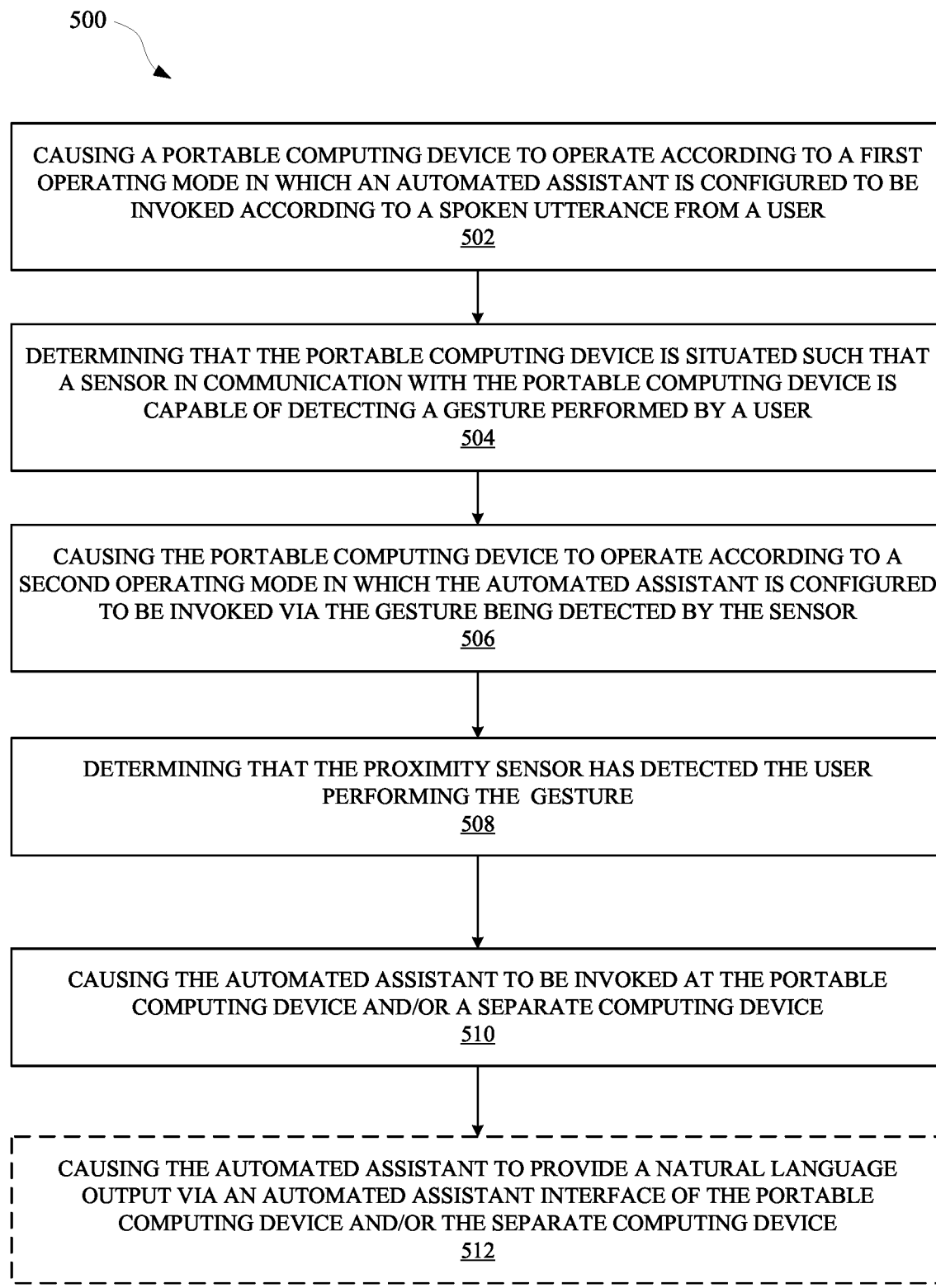
FIG. 5 illustrates in method for causing an automated assistant to perform a particular action when a computing device is operating in a mode via which the automated assistant is capable of being responsive to non-audio feature(s) of a physical gesture.

FIG. 5 illustrates in method 500 for causing an automated assistant to perform a particular action when a computing device is operating in a mode via which the automated assistant is capable of being responsive to non-audio features of a physical gesture. The method 500 can be performed by one or more applications, devices, and/or any other apparatus or module capable of interacting with an automated assistant. The method 500 can include an operation 502 of causing a portable computing device to operate according to a first operating mode. When operating in the first operating mode, the automated assistant can be configured to be invoked according to a spoken utterance from a user. For example, the spoken utterance can be a trigger phrase such as, "Assistant," and/or any other spoken utterance that is based on a natural language. Additionally, or optionally, when operating in the first operating mode, the automated assistant can be unresponsive to at least an initial invocation attempt that is exclusively non-audio, such as movement of an appendage or other motion created by the user.

The method 500 can further include an operation 504 of determining that the portable computing device is situated such that a sensor in communication with the portable computing device is capable of detecting a gesture performed by the user. The determination at operation 504 can be determined based on contextual data that is accessible to the portable computing device. The contextual data can be provided from one or more different sources, such as one or more different sensors, computing devices, and/or any other device capable of providing data. In some implementations, the contextual data can characterize an operating status of one or more devices that are on a common network with the portable computing device. Alternatively, or additionally, the determination at operation 504 can be based on operational data that is associated with the portable computing device. The operational data can characterize an operation of one or more devices and/or applications that are provided at the portable computing device, such as a control application and/or one or more sensors. The one or more sensors of the portable computing device can indicate an orientation of the portable computing device, a velocity, a trajectory, acceleration, an amount of light within an environment of the portable computing device, a temperature, and/or any other information that can be characterized by a computing device. For instance, a sensor output can be used by the portable computing device to generate trajectory data that characterizes a velocity and/or a direction in which the portable computing device is moving.

The operational data and/or the contextual data can indicate that the portable computing device is physically separated from the user and/or at a location that is within a distance in which a sensor of the portable computing device can be responsive to a physical gesture performed by the user. Alternatively, or additionally, the contextual data and/or the operational data can indicate that the portable computing device is located within an environment that includes audio, such as ambient noise, that would interrupt a spoken utterance provided by the user to the portable computing device. For instance, an output of a microphone can detect noise created by one or more other persons and/or one or more other computing devices, and determine, based on a level of noise, that the noise would interfere with the portable computing device detecting a spoken utterance from the user.

The method 500 can further include an operation 506 of causing the portable computing device to operate according to a second operating mode in which the automated assistant can be invoked via the gesture being detected by the sensor. As a result of operating in the second operating mode, interference that would otherwise occur and interrupt the portable computing device, when detecting a spoken utterance, can be obviated by causing the portable computing device to be responsive to non-audio features of particular gestures. For example, an amount of space occupied by an appendage of the user, a change in an amount of space occupied by an appendage of the user, a velocity and/or an acceleration of an appendage of the user, a shape and/or a change in shape of one or more appendages of the user, and/or any other physical attribute of the user can be detected by the portable computing device when operating in the second operating mode.

The method 500 can also include an operation 508 of determining that the proximity sensor has detected the user performing the gesture. The gesture can be, for example, a hand waving motion performed by the user. In some implementations, the gesture can be a movement of the mouth of the user, wherein the portable computing device is responsive to the characteristics of the movement of the mouth of the user and not any audio created in response to the user moving their mouth. In this way, the user can audibly mouth a physical gesture that is detected by the portable computing device when the portable computing device is operating in the second operating mode. In some implementations, the portable computing device can include one or more proximity sensors, and/or an array of proximity sensors, thereby allowing the automated assistant to be responsive to changes in position of an appendage of the user when the user has placed their appendage within a distance from the portable computing device that allows the proximity sensors to be responsive to the movement of the appendage.

The method 500 can also include an operation 510 of causing the automated assistant to be invoked at the portable computing device and/or a separate computing device. For example, the user may be within an environment such as their home, which can include multiple computing devices that have access to the automated assistant. If one particular device is playing music, another computing device can detect the music and transition into the second operating mode. A physical gesture can be detected by the other computing device in order to make adjustments to the music playing operation at the particular computing device. In this way, the user does not necessarily have to project an audible spoken utterance in order to manipulate the music playing operation, but, rather, can rely on at least one other device transitioning to the second operating mode, thereby allowing the user to perform gestures that have non-audio features for controlling the music playback operation.

Optionally, the method 500 can include an operation 512 of causing the automated assistant to provide a natural language output via an automated assistant interface of the portable computing device and/or the separate computing device. For example, when the portable computing device is operating in the second operating mode, and the user performs a physical gesture to control the automated assistant, the physical gesture can cause the automated assistant to provide a natural language output at the portable computing device and/or the separate computing device. The natural language output can be, for example, an audio output (e.g., a portion of an audible dialog or other natural language speech) from a speaker of the portable computing device or the separate computing device, a graphical display element provided at is display panel of the portable computing device or the separate computing device, and/or any other type of natural language output that can be provided via a modality of a computing device. In this way, although an automated assistant may be providing an output at the separate computing device, the user can perform a physical gesture directed at the portable computing device in order to control one or more operations or actions being performed by the automated assistant at the separate computing device. This can allow for the distribution of processing of gestures across multiple devices, rather than relying on a single device that is already actively performing an operation to process or otherwise be responsive to such gestures. This can preserve computational resources, as well as reduce power spikes that can occur at a particular device that has been designated to exclusively be responsive to, or process, gestures, rather than allowing multiple other computing devices to be responsive to, or process, various types of gestures.

Figure 6:
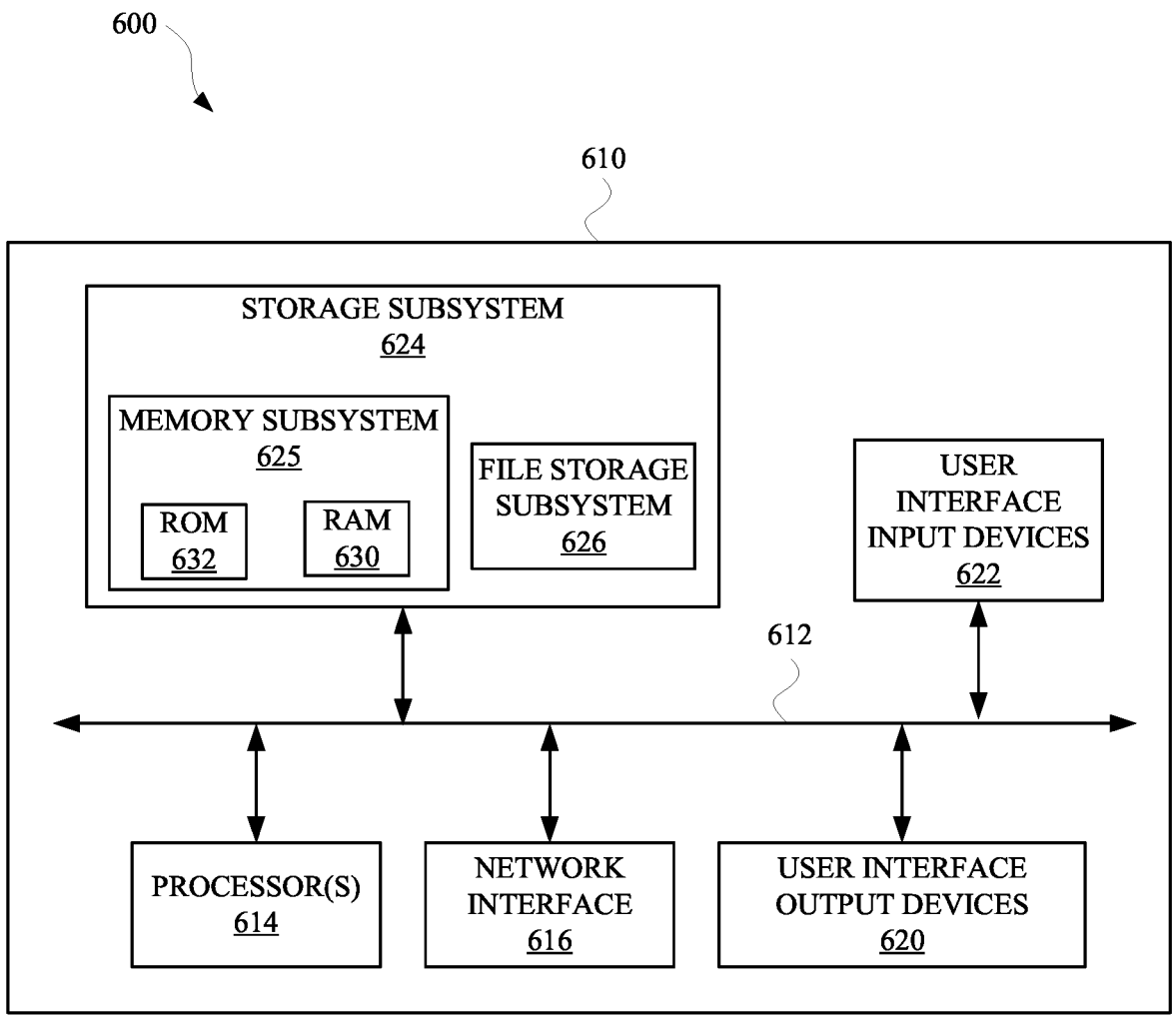
FIG. 6 is a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 400, method 500, and/or to implement one or more of computing device 110, automated assistant 112, mode selection engine 114, server device 224, client device 206, server computing device 326, client computing device 302, docking apparatus 336, and/or any other device, application, and/or operation discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

I claim:

1. A method implemented by one or more processors, the method comprising:
   receiving, by a portable computing device that is operating according to a first operating mode, a near-field communication (NFC) transmission from a docking apparatus,
      wherein the NFC transmission indicates a presence of the docking apparatus to the portable computing device, and
      wherein, when the portable computing device is operating in the first operating mode:
         the portable computing device invokes an automated assistant in response to a spoken utterance from a user, and
         does not invoke the automated assistant in response to a non-audio feature of a physical gesture performed by the user;
   determining, in response to receiving the NFC transmission, that the portable computing device is docked at the docking apparatus, wherein the docking apparatus provides mechanical support to at least a portion of the portable computing device;
   causing, in response to determining that the portable computing device is docked at the docking apparatus, the portable computing device to operate according to a second operating mode,
      wherein, when the portable computing device is operating according to the second operating mode:
         the portable computing device invokes the automated assistant in response to detecting the non-audio feature of the physical gesture performed by the user; and
   when the portable computing device determines, when operating according to the second operating mode, that the non-audio feature of the physical gesture was performed by the user:
      invoking the automated assistant.

2. The method of claim 1, wherein invoking the automated assistant comprises:
   causing the automated assistant to perform certain processing of audio data, captured by a microphone of the portable computing device, wherein the certain processing is not performed when the automated assistant is not invoked.

3. The method of claim 2, further comprising determining, based on the certain processing of the audio data, that the user has provided a spoken natural language input to the automated assistant.

4. The method of claim 3, wherein the physical gesture is detected by a proximity sensor that is integral to the portable computing device.

5. The method of claim 1, further comprising:
   determining that contextual data, which characterizes a context of the portable computing device, satisfies a criterion for transitioning the portable computing device from the first operating mode to the second operating mode,
   wherein causing the portable computing device to operate according to the second operating mode is further in response to determining that the contextual data satisfies the criterion.

6. The method of claim 5, wherein the context is a mode of transportation in which the docking apparatus is being carried, and the criterion identifies an automobile as at least one mode of transportation in which the portable computing device, when docked, can transition from the first operating mode to the second operating mode.

7. The method of claim 1, wherein the physical gesture is positioning an appendage proximate enough to the portable computing device to cause a change in sensor output of a sensor that is integral to the portable computing device.

8. The method of claim 7, wherein the sensor is a proximity sensor.

9. The method of claim 7, wherein the physical gesture is a hand wave.

10. The method of claim 7, wherein the sensor is a camera.

11. A portable computing device comprising:
   sensors;
   memory storing instructions;

one or more processors executing the instructions to:
receive, at a given sensor of the sensors and while operating according to a first operating mode, a near-field communication (NFC) transmission from a docking apparatus,
wherein the NFC transmission indicates a presence of the docking apparatus to the portable computing device, and
wherein, when the portable computing device is operating in the first operating mode:
the portable computing device invokes an automated assistant in response to a spoken utterance from a user, and
does not invoke the automated assistant in response to a non-audio feature of a physical gesture performed by the user;
determine, in response to receiving the NFC transmission, that the portable computing device is docked at the docking apparatus, wherein the docking apparatus provides mechanical support to at least a portion of the portable computing device;
cause, in response to determining that the portable computing device is docked at the docking apparatus, the portable computing device to operate according to a second operating mode,
wherein, when the portable computing device is operating according to the second operating mode:
the portable computing device invokes the automated assistant in response to detecting, at an additional sensor of the sensors, the non-audio feature of the physical gesture performed by the user; and
when the portable computing device determines, when operating according to the second operating mode, that the non-audio feature of the physical gesture was performed by the user:
invoke the automated assistant.

12. The portable computing of claim 11, wherein in invoking the automated assistant one or more of the processors are to:
cause the automated assistant to perform certain processing of audio data, captured by a microphone of the portable computing device, wherein the certain processing is not performed when the automated assistant is not invoked.

13. The portable computing of claim 12, wherein in executing the instructions one or more of the processors are further to determine, based on the certain processing of the audio data, that the user has provided a spoken natural language input to the automated assistant.

14. The portable computing of claim 13, wherein the additional sensor is a proximity sensor.

15. The portable computing of claim 11, wherein in executing the instructions one or more of the processors are further to:
determine that contextual data, which characterizes a context of the portable computing device, satisfies a criterion for transitioning the portable computing device from the first operating mode to the second operating mode,
wherein in causing the portable computing device to operate according to the second operating mode, one or more of the processors are to cause the portable computing device to operate according to the second operating mode further in response to determining that the contextual data satisfies the criterion.

16. The portable computing of claim 15, wherein the context is a mode of transportation in which the docking apparatus is being carried, and the criterion identifies an automobile as at least one mode of transportation in which the portable computing device, when docked, can transition from the first operating mode to the second operating mode.

17. The portable computing of claim 11, wherein the physical gesture is positioning an appendage proximate enough to the portable computing device to cause a change in sensor output of the additional sensor.

18. The portable computing of claim 17, wherein the additional sensor is a proximity sensor.

19. The portable computing of claim 17, wherein the physical gesture is a hand wave.

20. The method of claim 17, wherein the additional sensor is a camera.

* * * * *